May 27, 1958     H. VOGT     2,836,641
PROCESS FOR THE PRODUCTION OF ELECTRODES
FOR ELECTRO-CHEMICAL PURPOSES
Original Filed April 25, 1949
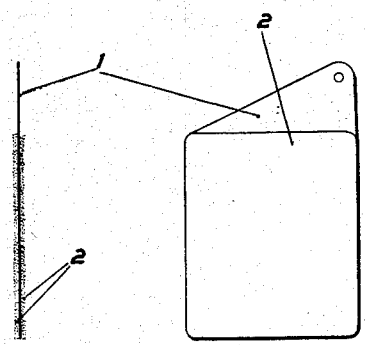
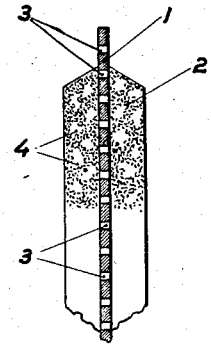
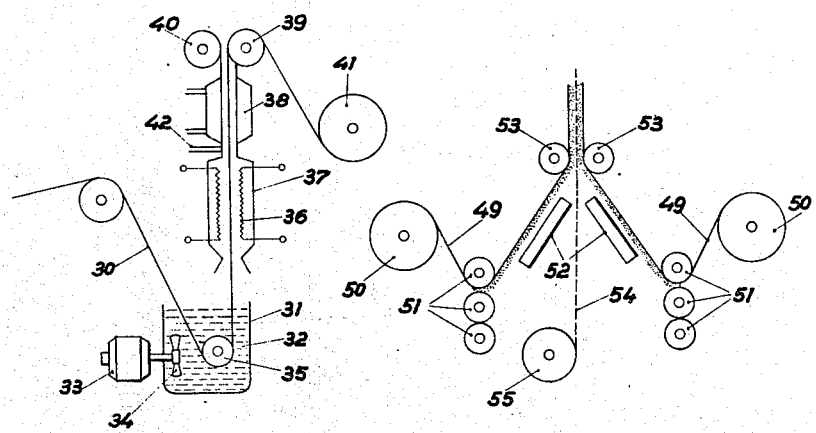
Inventor: Hans Vogt
by: K. H. Tauchen
his Patent Agent

United States Patent Office 2,836,641
Patented May 27, 1958

2,836,641

PROCESS FOR THE PRODUCTION OF ELECTRODES FOR ELECTRO-CHEMICAL PURPOSES

Hans Vogt, Erlau, Germany

Original application April 25, 1949, Serial No. 89,416, now Patent No. 2,681,375, dated June 15, 1954. Divided and this application April 26, 1954, Serial No. 425,624

Claims priority, application Sweden May 4, 1948

6 Claims. (Cl. 136—20)

The present invention relates to electrodes for electric batteries.

It is an object of the present invention to provide a simple and inexpensive process for producing electrodes which combine high efficiency and low resistance with low weight.

Another object of the invention is to provide a simple and inexpensive process for producing electrodes, of the type referred to, that may readily be impregnated with the electro-chemically active substance.

These and other objects of the present invention will be apparent from the following description of the accompanying drawing which illustrates certain preferred embodiments thereof and wherein:

Fig. 1 is a cross section through an electrode produced in accordance with the invention, its thickness being shown in exaggerated form for reasons of clarity.

Fig. 2 is a side elevation of the electrode illustrated in Fig. 1.

Fig. 3 is a fragmentary cross section through another electrode produced in accordance with the invention, likewise shown with exaggerated thickness for reasons of clarity.

Figs. 4 and 5 are diagrams illustrating the manner in which such electrodes are produced in accordance with the invention.

According to the invention, metal powders are deposited upon, and sintered onto, a thin carrier sheet to form micro-porous metal layers thereon. The carrier sheet may be formed by a solid or a perforated metal foil, fine wire gauze, felted metal filaments, or the like, of a suitable thickness ranging for instance from 0.2 mm. to .05 mm., and the micro-porous metal powder layer should be of such thickness that the completed electrode has the appearance of a thin foil that may be less than 1 mm. in thickness, and preferably in the range of from .2 and .8 mm. Metal powders of low weight per unit volume, i. e., less than 1.5 grams per cm.³, should preferably be employed, such as nickel powder or iron powder. These powders may be produced by chemical or thermal decomposition of salts of the respective metals (for instance, nickel nitrate or iron nitrates) at temperatures from 400° C. to 500° C. and subsequent reduction at temperatures from 600° C. to 800° C.

According to a preferred form of the invention I prepared a liquid suspension from a light metal powder, pore-formation promoting spacer bodies, and a suitable liquid, such as water or a hydro-carbon. Carbon or carbonate particles, especially particles of ammonium carbonate may serve as spacer bodies. I deposit the described suspension in a thin layer upon the carrier foil, dry it on the carrier foil and sinter it in a reducing atmosphere at temperatures between 600° C. and 1,000° C. to solidify it into a micro-porous metal layer that adheres to the carrier foil. The pore-formation promoting materials may be removed before, during or after the actual sintering process.

While the metal powder may be spread over, or sprayed onto, the carrier foil I prefer its application by a dipping process. For this purpose the carrier foil may be passed in a continuous process through a metal powder suspension and, depending upon the consistency of the suspension, this process may be repeated to obtain a desired thickness. The subsequent drying, sintering and impregnation of the coated carrier with the electro-chemically active substances may then likewise occur in a continuous process. In this manner I produce a ductile electrode skeleton which is very suitable for the reception of the proper hydroxides, such as hydroxides of cadmium, nickel, iron or cobalt. This skeleton may be impregnated in the customary manner by introducing salts of any one of these metals into its pores and reacting these salts with an alkali to precipitate the electro-chemically active hydroxides which then adhere firmly to the pores. In the finished electrode the weight of the dry hydroxides incorporated therein may be equal to the weight of the electrode skeleton.

According to a modified form of my process, two paper strips are impregnated with mineral substances, are then coated on one side with the metal powder emulsion in a continuous process, and are subjected to a preliminary drying process, whereupon they are pressed with their coated faces against an interposed carrier sheet in the form of an extremely thin texture of light metal. Thereafter the drying process is completed, and the joined strips are sintered, which may be performed in a continuous process or may be carried out after the strips have been cut into lengths of appropriate size and are stacked in packs or piles.

Referring now to the drawings, the electrodes illustrated in Figs. 1 and 3 comprise a metal foil 1 which may be a sheet of nickel or iron having a thickness of from about .03 to .05 mm. Said foil may be solid, as shown in Fig. 1, or perforated, as shown in Fig. 3. Sintered upon its sides are micro-porous metal layers 2 whose interstices are filled with the active hydroxides. In Fig. 3 the perforations in the foil are indicated at 3, and the reference numeral 4 designates relatively large cavities within the metal layers 2 which are produced by the previously mentioned spacer bodies that are removed from the layer prior, during or after the sintered process. Such cavities improve the ratio of hydroxide volume to metal weight to a substantial degree.

Fig. 4 illustrates digrammatically one of the methods for producing electrodes of the type illustrated in Figs. 1, 2 and 3. According to Figure 4 a carrier strip 30 supplied from a feed roller (not shown) passes underneath a roller 35 through a vessel 31 containing a suspension of suitable consistency that comprises a metal powder, poreformation promoting spacer bodies, and adhesive and a suitable solvent therefor. A propeller 34 driven by a motor 33 serves to keep the suspension 32 in vessel 31 in continuous agitation. When emerging from the suspension 32 the strip 30 is covered on both sides with a coating of a thickness of some tenths of a millimeter. The coated strip then passes between electric heating elements 36 disposed within a vertical furnace 37, to dry the coating and drive off the spacer bodies. Thereafter the strip passes through a second furnace (not shown) within which the metal powder layers are sintered in a reducing atmosphere at temperatures ranging from 600° C. to 1,000 ° C. Thereafter the strip passes through a water cooled jacket 38 from which it emerges between rollers 39 and 40 to pass onto a reel 41 or similar device. It may also successively pass through installations (not shown) wherein any residual spacer bodies in the metal layers are dissolved and wherein the electrode may, in consecutive stages, be impregnated with metal salts, dried, treated to precipitate the hydroxides, washed and subjected to a final drying operation.

According to the method illustrated in Fig. 5, two strips 49 of glazed paper pass from supply reels 50 underneath the uppermost rollers of two batteries of superposed rollers 51. The lowermost rollers of said batteries are ribbed and are immersed in an iron powder suspension. In this manner the lower faces of the paper strips 49 are coated with a layer of the iron powder suspension. Both strips then travel past heating elements 52 by which the applied layers are appropriately dried. Thereupon the strips pass between two rollers 53 which press them with their coated faces against a metal netting 54 that is fed from a supply reel 55 into the space between the rollers 53. The composite strip emerging from between the rollers 53 may then be treated in the same manner as described in connection with Fig. 4. Alternatively, the composite strip may be guided along a horizontal path and automatically cut into pieces of suitable length that are stacked into packs. These are then sintered within a furnace in a reducing atmosphere at a suitable temperature, such as 800° C., for a period of from one to two hours. During the sintering process the paper strips are burnt off, but the mineral glazing substances contained in said paper strips prevent the superposed metal powder layers from sintering together. Hence, the individual electrodes retain their identity and may, after a superficial cleaning, be impregnated with the electrically active substances in the usual manner.

The resistance of batteries comprised of electrodes produced in accordance with the present invention is extremely low, i. e., about one-tenth to one-twentieth of batteries comprised of conventional sheet metal electrodes or conventional sinter electrodes. Batteries made from electrodes produced in accordance with the invention are, therefore, able to stand far stronger charging and discharging currents than previously permissible and their efficiency is improved accordingly. Furthermore, the thin electrodes produced in accordance with the invention may easily and quickly be impregnated and their cavities may be filled to capacity with the electro-chemically active hydroxides, whereas the impregnation of the thick sinter electrodes of conventional design presented serious difficulties.

While I have illustrated my invention with the aid of an exemplary process, it will be understood that I do not wish to be limited to the specific steps and temperatures given by way of example, which may be departed from before departing from the scope and spirit of the invention.

This is a division of my co-pending patent application Serial No. 89,416, filed April 25, 1949, now U. S. Patent No. 2,681,375, dated June 15, 1954, and claiming the priority of Swedish patent application No. 3,902, filed May 4, 1948.

I claim:

1. The process of producing electrodes for electrochemical purposes in a continuous operation which comprises depositing iron group metal powder in a continuous process onto both faces of an iron group metallic carrier strip to form a thin coating on each face thereof, passing the strip thus coated through a sintering zone maintained at a sintering temperature for the metal deposited on the carrier simultaneously to transform each metal powder coating into a micro-porous metal layer and sinter it onto said carrier strip, subsequently impregnating the layer bearing strip with electrochemically active hydroxides and cutting the strip into portions of appropriate length.

2. The process of producing electrodes for electrochemical purposes in a continuous operation which comprises applying a liquid suspension of an iron group metal powder containing pore-formation promoting materials in a continuous process to an iron group metallic carrier strip to form a thin coating on each face thereof simultaneously, passing the strip thus coated through a heating zone maintained at a sintering temperature for the metal powder to drive off said pore-formation promoting materials, transform the metal powder coating into a microporous metal layer, and sinter it onto said carrier strip, subsequently impregnating the layer bearing strip with electrochemically active hydroxides and cutting the strip into portions of appropriate length.

3. The process of producing electrodes for electrochemical purposes in a continuous operation which comprises applying a liquid suspension of an iron group metal powder in a continuous process to an iron group metallic carrier strip of a thickness ranging between 0.2 mm. and .05 mm. to form a thin coating on each face thereof simultaneously, passing the strip thus coated through a sintering zone maintained at a temperature of between 600° C. and 1,000° C. to transform the metal powder coating into a micro-porous metal layer and sinter it onto said carrier strip, subsequently impregnating the layer bearing strip with electrochemically active hydroxides and cutting the strip into portions of appropriate length.

4. The process of producing electrodes for electrochemical purposes in a continuous operation which comprises passing a thin iron group carrier strip of a thickness ranging from .02 to .05 mm. in continuous process through a homogeneous, agitated, liquid suspension of iron group metal powder containing pore-formation promoting bodies having carbon content, to form thin coatings of said suspension on both faces thereof, drying said coatings and passing the coated strip through a sintering zone maintained at a temperature between 600° C. and 1,000° C. to drive off said pore-formation promoting bodies, transform said coatings into micro-porous metal layers and sinter them onto said strip and subsequently impregnating the layer bearing strip with electrochemically active hydroxides.

5. The process of producing an electrode for electrochemical purposes in a continuous operation which comprises applying a thin coat of a liquid suspension of iron group metal powder in a continuous operation onto two strips of glazed paper, pressing the coated paper strips with their coated sides against each other while introducing a thin iron group metallic carrier sheet between them, and conducting the composite strip body through a heating zone maintained at a sintering temperature for the iron group metal powder applied to the paper strips so as to burn off the paper strips and transform the metal powder suspension coats into micro-porous metal layers, and sinter said layers onto the opposite sides of said metallic carrier sheet.

6. The process of producing an electrode for electrochemical purposes in a continuous operation which comprises applying a thin coat of a liquid suspension of iron group metal powder containing pore-formation promoting materials in a continuous operation onto two strips of glazed paper, pressing the coated paper strips with their coated sides against each other while introducing a thin iron group metallic carrier sheet between them, and conducting the composite strip body through a heating zone maintained at a sintering temperature for the iron group metal powder applied to the paper strips so as to burn off the paper strips, drive off the pore-formation promoting materials, transform the metal powder suspension coats into micro-porous metal layers, and sinter said layers onto the opposite sides of said metallic carrier sheet.

References Cited in the file of this patent

UNITED STATES PATENTS

| | | |
|---|---|---|
| Re. 22,373 | Benner et al. | Sept. 14, 1943 |
| 2,122,053 | Burkhardt | June 28, 1938 |
| 2,187,086 | Koehring | Jan. 16, 1940 |
| 2,357,536 | Morse | Sept. 5, 1944 |
| 2,368,458 | Engle | Jan. 30, 1945 |
| 2,390,160 | Marvin | Dec. 4, 1945 |